United States Patent [19]
Behrens et al.

[11] Patent Number: 5,386,419
[45] Date of Patent: Jan. 31, 1995

[54] MULTIPLEXER FOR AT LEAST TWO INDEPENDENTLY OPERATING SIGNAL SOURCES

[75] Inventors: Michael Behrens; Michael Siebke, both of Nürnberg, Germany

[73] Assignee: U.S. Philips Corporation, New York, N.Y.

[21] Appl. No.: 107,545

[22] Filed: Aug. 17, 1993

[30] Foreign Application Priority Data

Aug. 20, 1992 [DE] Germany ................. 4227496

[51] Int. Cl.⁶ ............................................. H04J 3/06
[52] U.S. Cl. ................... 370/105.1; 370/108; 370/112
[58] Field of Search ............. 370/61, 80, 82, 100.1, 370/103, 105.1, 108, 110.1, 112; 375/107, 118; 359/158

[56] References Cited

U.S. PATENT DOCUMENTS 4,965,794 10/1990 Smith .......................... 370/105.1
5,265,090 11/1993 Guinand et al. ............... 370/112 X

FOREIGN PATENT DOCUMENTS 0460835 12/1991 European Pat. Off. .

*Primary Examiner*—Melvin Marcelo
*Attorney, Agent, or Firm*—Anne E. Barshcall

[57] ABSTRACT

In an arrangement for combining at least two source signals to a multiplex signal, source signals from independently operating source modules are transmitted to a multiplex module in which they are combined into the multiplex signal in a predetermined manner. An orderly operation of the modules is ensured in that each source module includes at least a memory, a write counter and a read counter. The counters are arranged to operate independently of each other and to generate the addresses when the data are being written into and read from the memory. The arrangement includes a memory for storing the frame-structured source signals at the start of a new frame starting at a predetermined initial address of the memory and for marking the memory address of the end of the frame with a marking bit. The arrangement also includes read logic for reading the source signals from the memory of the source modules under control of a clock signal supplied by the multiplex module, and for transmitting the source signals to the multiplex module. Each source module is arranged to supply a reset signal after the marked address has been read during reading of a frame. The arrangement is adapted to set the read counters of all source modules to the predetermined initial address when the reset signal is eliminated.

8 Claims, 4 Drawing Sheets

Fig.4

MULTIPLEXER FOR AT LEAST TWO INDEPENDENTLY OPERATING SIGNAL SOURCES

BACKGROUND OF THE INVENTION

The invention relates to a multiplexer including an arrangement for combining at least two source signals to a multiplex signal, in which the source signals from independently operating source modules are transmitted to a multiplex module in which they are combined to the multiplex signal in a predetermined manner. Such a multiplexer is known from EP 460835.

When a plurality of source signals is combined to a multiplex signal, the source signals should be synchronized in the phase position, converted to the target frequency and combined in a predetermined sequence. This problem occurs, for example in the Synchronous Digital Hierarchy. This object is sometimes even more difficult to realise in that the source modules supplying the source signals operate independently of each other and their output signals have to be combined to a multiplex signal in another module. In accordance with the prior art this object is generally solved by means of a method referred to as master-slave method in which one of the modules, generally the multiplex module, becomes the master of and controls the other modules.

SUMMARY OF THE INVENTION

It is an object of the invention to provide a multiplexer of the type described in the opening paragraph, in which the problem of combining the source signals is solved without the use of a master.

According to the invention this object is solved in that each source module comprises at least a memory, a write counter and a read counter, the counters being arranged to operate independently of each other and to generate the addresses when the data are being written into and read from the memory, said arrangement comprising means for storing the frame-structured source signals at the start of a new frame as from a predetermined initial address of the memory and for marking the memory address of the end of the frame by means of a marking bit, means for reading the source signals from the memory of the source modules in dependence upon a clock signal supplied by the multiplex module, and for transmitting the source signals to the multiplex module, each source module being arranged to supply a reset signal after the marked address has been read during reading of a frame, while the arrangement is adapted to set the read counters of all source modules to the predetermined initial address when the reset signal is eliminated.

The source modules, each which operate independently of each other, include a write counter and a read counter. The write counters of the source modules are clock-adapted to the input signal of the source modules, i.e. the original source signals. These signals, which may be, for example, Synchronous Digital Hierarchy signals, may not be synchronized with each other. Within a source module the write and read counters also operate independently of each other.

The source signals are written into the memory of each source module in a very special way, providing an orientation in accordance with the structure of the source signals which are, for example frame-structured in the case of Synchronous Digital Hierarchy.

At the start of each new frame the subsequent frame is stored as from a given initial address of the memory. The end of the frame, or the corresponding memory address in the memory, is marked by means of a marking bit. Thus, it is always known in which range of the memory a frame is stored. The initial address is fixed anyway; the final address is indicated by the marking bit.

When a source signal is read from a memory of a source module, it is known which range of values is to be covered by the read counter of the source module when the data are read from the memory.

The signals are read from the memory of the source module in dependence upon a clock signal supplied by the multiplex module. Hence, this read process is independent of the clock of the write process in any source module.

In order that the single source modules and the read processes being effected in their memories are performed in a coordinated manner, each source module reaching the marked address during reading supplies a reset signal. This reset signal is used in the source module, in which it was generated, as well as in all other source modules for the purpose of setting the read counters of the source modules to the predetermined initial address.

With these measures it is achieved that a phase offset of the source signals is compensated for. Furthermore an adaptation to different transmission frequencies takes place. An automatic monitoring of synchronizing losses is also realised. Moreover, an automatic initialization is achieved when the arrangement starts to operate. These advantages are particularly obtained in that the source modules are quasi-forcibly synchronized up by resetting all source modules when the marking bit is reached in a source module. The same applies to the initialization in which the counters may in principle be in any position; when the first read counter of the source modules has reached a final address, all source modules and their react counters are then reset to their initial address.

In accordance with an embodiment of the invention, a source module has such a memory size such that the memory can accommodate at least one frame of the source signal associated thereto.

Writing of a frame of a source signal with its start at the predetermined initial address may be simplified if the memory has a size such that it covers one frame. When the end of this frame is reached, the next address is then always the predetermined initial address again. The memory of the FIFO may also have a larger size which is then advantageously an integral multiple of a frame.

The processes of reading from the single source modules can be advantageously controlled with the multiplex module is arranged to individually generate a release signal for each source module and additionally to control the processes of reading and transmitting data from the source modules to the multiplex module.

In a further embodiment of the invention, the value of the write counter is checked in each source module at the instant when the read counter is set to the predetermined initial address. A reset signal is generated at the instant when the marking bit would be written in the correctly synchronized state of the source module when the write counter is not in a predetermined address range.

There will be an error if the value of the write counter is not within a given range at the instant when the read counter of a source module is set to the predetermined initial address. The synchronicity and probably also a part of the source signal data to be transmitted has been lost. In this case it is advantageous to perform a subsequent up-synchronization of all source modules and to subsequently generate a reset signal. The reset signal is generated at the instant when the marking bit would be written into the memory of the source module in the case of a correct up-synchronization of the source module. The reset process is thus enforced at the instant when the reset process would be started by the marking bit in the ease of a correct up-synchronization of the source module or its write counter.

In accordance with a further embodiment of the invention, the memory may be advantageously a first-in-first-out memory (FIFO); this memory arrangement is advantageous particularly because of the fact that the data are cyclically written and read.

The multiplexer according to the invention may be advantageously used for Synchronous Digital Hierarchy signals. In accordance with further embodiments of the invention, the multiplex signal may be, for example an STM-1 signal of the Synchronous Digital Hierarchy. The source signals may be TUG-2 or TUG-3 signals of the Synchronous Digital Hierarchy which are combined to an STM-1 multiplex signal.

BRIEF DESCRIPTION OF THE DRAWING

These and other aspects of the invention will be apparent from and elucidated with reference to the embodiments described hereinafter.

In the drawings

FIG. 4 shows a source signal TUG-3 of the Synchronous Digital Hierarchy.

DETAILED DESCRIPTION OF THE PREFERRED EMBODIMENTS

Figure 1:
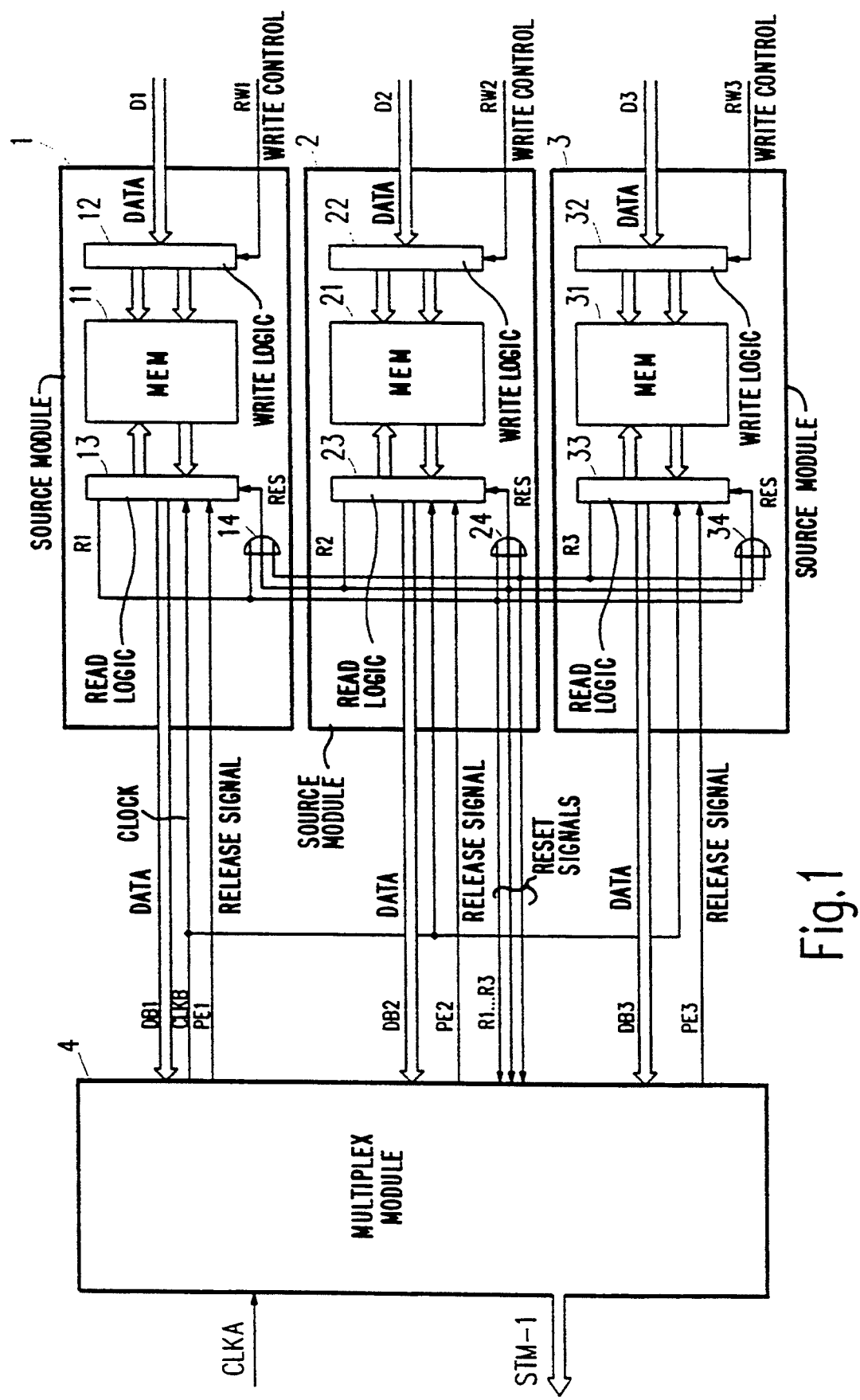
FIG. 1 shows an arrangement comprising three source modules and one multiplex module.

An arrangement shown in FIG. 1 and particularly suitable for signals of the Synchronous Digital Hierarchy comprises three source modules 1, multiplex module 4.

The source module 1 receives a data signal D1 which is applied within the source module 1 to a write logic 12 particularly comprising a write counter which is not shown in the Figure. The write logic 12 controls the process of writing the data D1 into a memory 11 controlled by a write control signal RW1.

More specifically, a first-in-first-out memory (FIFO) may be used as the memory 11 of the source module 1 and its size may be dimensioned in such a way that it can accommodate exactly one frame of the source signal D1.

The source module I further incorporates a read logic 13 which particularly comprises a read counter which is not shown in FIG. 1.

The process of reading data from the memory 11 is particularly controlled by a clock signal CLKB and a release signal PE1, both of which are supplied by the multiplex module 4.

When the source signal data D1 are written into the memory 11, a new frame of the source signal D1 is always stored starting from a predetermined initial address of the memory at the start of such a new frame. The subsequent bytes are successively stored until the end of the frame is reached. This address is marked by means of a marking bit within the memory 11. It is thereby initially ensured that a frame is stored in the memory starting from a given predetermined initial address.

Consequently, it is known during the read process at which address a new frame is stored in the memory 11. When the end of the frame is reached during the read process and when the marking bit is detected, the read logic 13 supplies a reset signal R1. This reset signal is used to reset both the read counter within the read logic 13 of the source module 1, and the read counters of the other source modules to the marked initial address. It is thereby ensured that whenever one of the read counters of the source modules reaches the marking bit, all read counters of the source modules are subsequently reset to their initial value.

In the arrangement shown in FIG. 1 these reset signals of all source modules within the source module 1 are applied to an OR-gate 14 whose output signal is applied to the read logic 13.

The source modules 2 and 3 have the same structure as the source module 1; more specifically, the source module 2 generates a reset signal R2 and the source module 3 generates a reset signal R3. The reset signals R1, R2 and R3 in each source module are applied to OR-gates 14, 24 and 34, respectively, whose output signals are applied as reset signals RES to the respective read counter within the write logic of the source module.

The data transmitted from the memories 11, 21 and 31 of the source modules 1, 2 and 3 to the multiplex module 4 are denoted by DB1, DB2 and DB3, respectively in FIG. 1. For the read process the multiplex module 4 supplies a clock signal CLKB generated jointly for all source modules 1, 2 and 3. However, release signals PE1, PE2 and PE3 are generated for each source module individually. The reset signals R1, R2 and R3 described hereinbefore are also applied to the multiplex module 4 in order that this module can respond accordingly to the reset process and can particularly adapt the read processes.

A clock signal CLKA which may be divided down, for example, for gaining the clock signal CLKB, is externally applied to the multiplex module 4.

The multiplex module 4 supplies a multiplex signal which is denoted as signal STM-1 of the Synchronous Digital Hierarchy in the Figure. Also the source signals D1, D2 and D3 may be Synchronous Digital Hierarchy signals, particularly the TUG-2 signals or TUG-3 signals which are combined to a multiplex signal STM-1.

The process of transmitting data from one of the source modules 1, 2 or 3 to the multiplex module 4 will be described in greater detail with reference to FIGS. 2 and 3.

Figure 2:
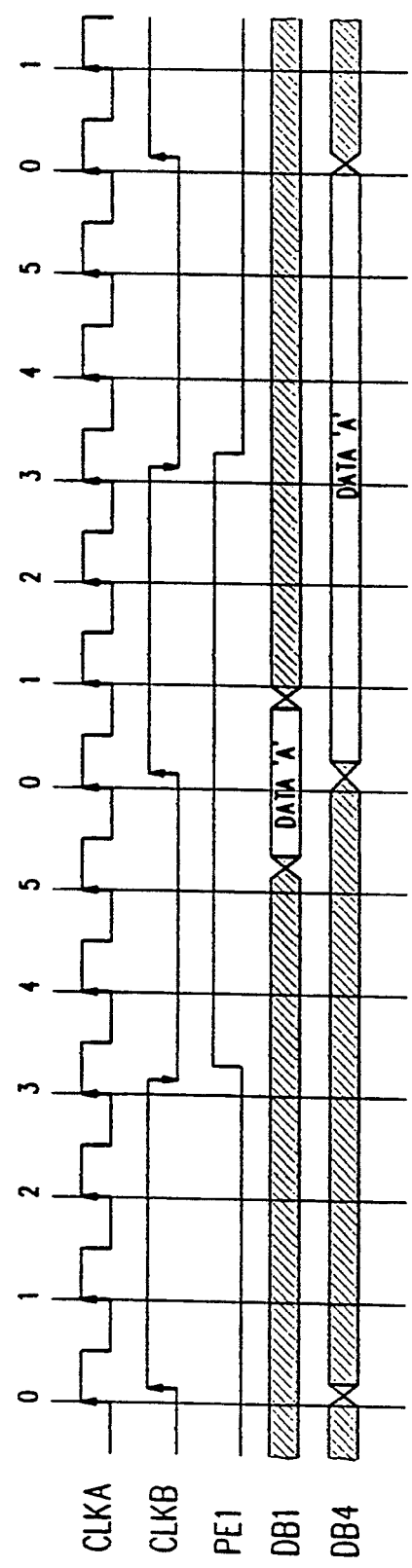
FIG. 2 shows a time diagram of some signals of the arrangement of FIG. 1 for transmitting a data byte from a source module to the multiplex module.

FIG. 2 shows a characteristic curve as a function of time of the clock signal CLKA which is divided down in the multiplex module 4 to the clock signal CLKB shown by way of the second characteristic curve, which clock signal is applied to each source module 1, 2 and 3.

The third characteristic curve in FIG. 2 shows the release signal PE1 which is supplied by the multiplex module 4 to the source module 1. After a low-high edge of the release signal PE1 has appeared during the low state of the clock signal CLKB, the multiplex module 4 expects a new data sequence from the associated source module, in this case source module 1, when the next low-high edge of the clock signal CLKB appears. Consequently, already before this instant, in FIG. 2 approximately two clocks of the clock signal CLKA after appearance of the low-high edge of the release signal PE1, the source module 1 applies a new data sequence to the data bus DB1 of FIG. 1. This is denoted by DATA "A" in the fourth characteristic curve DB1 in FIG. 2. When the low-high edge of the clock signal CLKB appears, these dam are taken over within the multiplex module 4, which is shown by means of the fifth characteristic curve DB4 in FIG. 2. If subsequently no further data sequence is to be transmitted, the multiplex module 4 sets the signal to its low state again after approximately one clock cycle of the signal CLKB after the low-high edge of the PE1 signal, thus approximately subsequent to the next high to low change of the signal CLKB after the data sequence has been applied to DB1.

FIG. 2 shows the transmission of only one data sequence from the source module 1 to the multiplex module 4.

Figure 3:
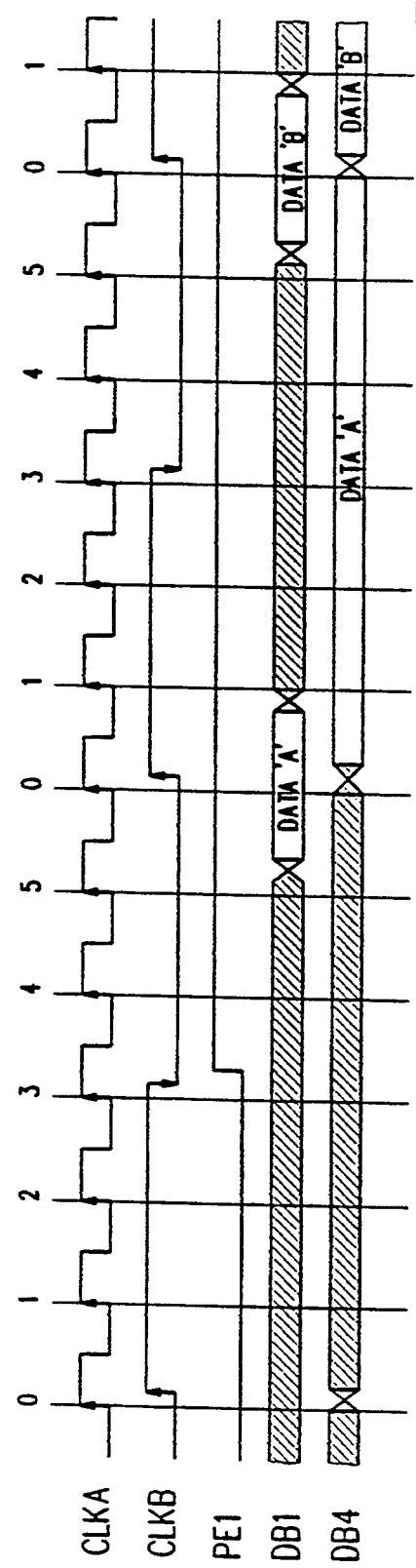
FIG. 3 shows a time diagram, similar to that of FIG. 2, for transmitting a plurality of bytes.

FIG. 3 shows the corresponding transmission for a plurality of consecutively transmitted data sequences denoted by DATA "A" and DATA "B" in FIG. 3.

In FIG. 3 the first data sequence A is transmitted in the same way as in FIG. 2. However, the release signal PE1 retains its high level after transmission of the first data sequence A. This signalizes to the source module 1 that a further data sequence is to be subsequently transmitted. This data sequence is made available approximately at the second clock of the signal CLKA after the next high-low edge the clock signal CLKB has appeared and is taken over by the multiplex module 4 at the next low-high edge of the clock CLKB. This data sequence is denoted by DATA "B" in FIG. 3.

In accordance with FIG. 3, the consecutive transmission of further data sequences is continued until the release signal PE1 changes to low level again after transmission of a data sequence and after a high to low change of the clock signal CLKB, which signals to the source module that the end of the data transmission has been reached.

When data according to FIG. 2 or FIG. 3 are transmitted, it is always known to the multiplex module which data sequence, for example, which byte within a frame of the transmitted signal is concerned, because the source module was reset in a defined way and because this reset process via the signals R1 to R3 is also known to the multiplex module 4. Hence, as from this instant, it is known to the multiplex module 4 which positions are occupied by each read counter of the source modules and thus also which data sequence is transmitted. The transmission of data shown by way of example in FIGS. 2 and 3 between the source module 1 and the multiplex module 4 also takes place in a corresponding manner between the source module 2 and the multiplex module 4 and between the source module 3 and the multiplex module 4, while the release signals PE1, PE2 and PE3 are generated individually for the respective source module of multiplex module 4. In this way the multiplex module 4 can call the data sequences exactly in the way in which it requires these sequences for the purpose of composing the multiplex signal.

Figure 4:
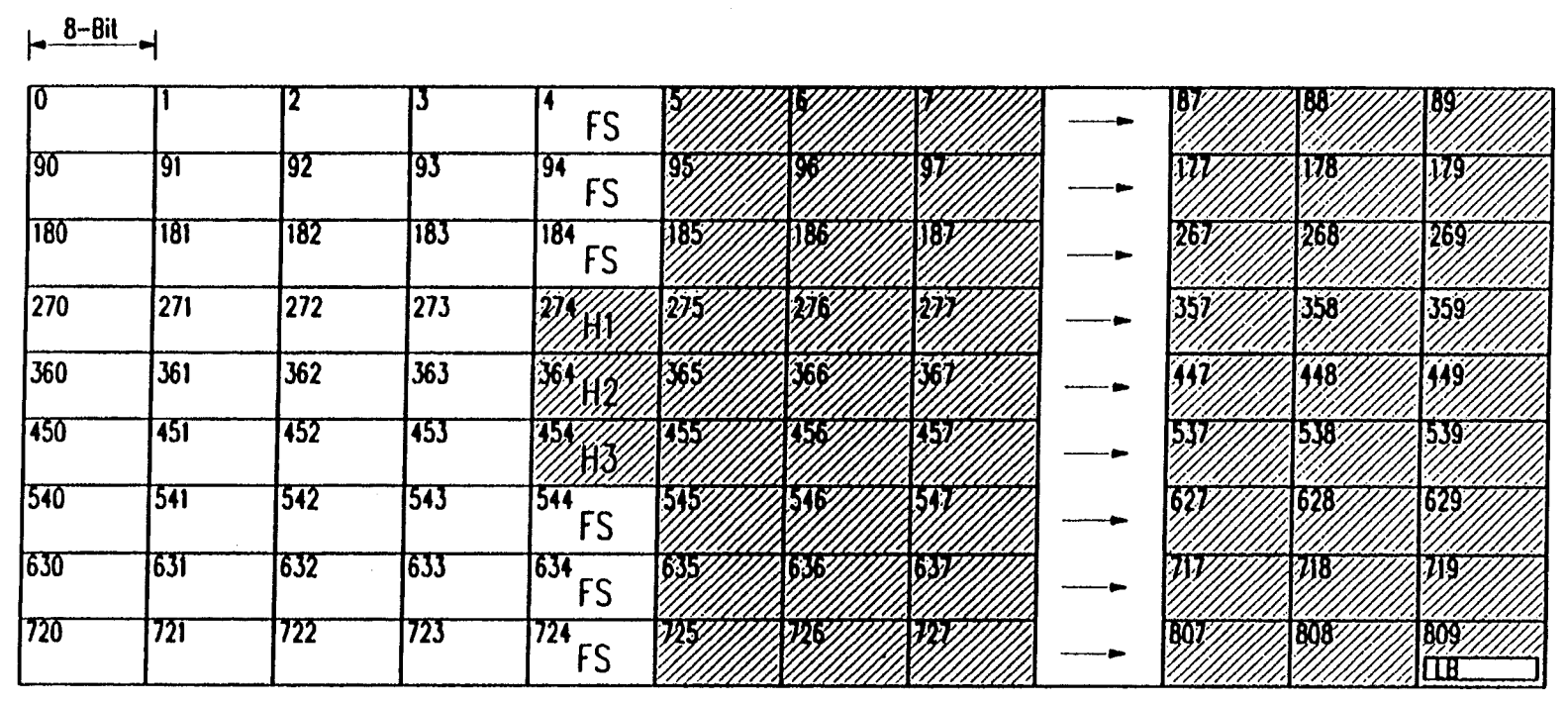

FIG. 4 shows diagrammatically a frame of a signal TU-3 of the Synchronous Digital Hierarchy. This signal may be, for example one of the source signals D1, D2 or D3. The bytes of the TU-3 signal which are shaded in FIG. 4 are those bytes comprising a useful load and which are written into the respective memory 11, 21 or 31 of the source module. The first byte of this useful load, which is transmitted within a frame, is written at a predetermined initial address of the respective memory 11, 21 or 31. When the last byte is reached, which has the number 809 and denoted by LB in FIG. 4, a marking bit is written into the memory. As already explained hereinbefore, this marking bit is used during the reading process for subsequently resetting the read counters of all source modules.

Instead of the TU-3 signal shown in FIG. 4, other signals, for example TUG-2 signals may of course also be used as source signals; in any case a corresponding marking bit should be set in the memory in which the source signal is stored, when the last byte of the useful signal of a frame has been reached.

We claim:
1. A multiplexer comprising
at least two independently operating source modules, each producing a respective source signal, which source signals are frame-structured, each source module comprising
a respective memory;
a respective write counter;
a respective read counter, the counters being arranged to operate independently of each other and to generate addresses for the memory when data are being written into and read from the memory; and respective supplying means for supplying a reset signal;
means for storing the respective source signals at the start of respective frames starting from predetermined respective initial addresses of the respective memories and for marking respective memory addresses of respective ends of the respective frames by means of respective marking bits;
means for reading the source signals from the respective memories of the source modules under control of a clock signal, the respective supplying means supplying the reset signals when the addresses marked by the respective marking bits are reached during reading of the respective frame; and
a multiplex module, for
combining the source signals from the means for reading into a multiplex signal in a predetermined manner and
for supplying the clock signal.

2. A multiplexer as claimed in claim 1, wherein, in each source module (1, 2, 3), the respective memory has a size sufficient to accommodate at least one respective frame of the respective source signal.

3. A multiplexer as claimed in claim 1, wherein the multiplex module is arranged to
generate a respective release signal for each source module and
control reading and transmitting the data from the source modules to the multiplex module.

4. A multiplexer as claimed in claim 1, wherein
the value of the write counter is checked in each source module (1, 2, 3) at the instant when the read counter is set to the predetermined initial address, and
the reset signal is generated at the instant when the marking bit would be written in the correctly synchronized state of the source module when the write counter is not in a predetermined address range.

5. A multiplexer as claimed in claim 1, wherein the memories (11, 21, 31) are first-in-first-out memories (FIFO).

6. A multiplexer as claimed in claims 1, wherein the source signals and the multiplex signal are Synchronous Digital Hierarchy signals.

7. A multiplexer as claimed in claim 6, characterized in that the multiplex signal is a signal of the STM-1 hierarchy.

8. A multiplexer as claimed in claim 6, characterized in that the source signals are signals of the TUG-2 or TUG-3 hierarchy.

* * * * *